(12) United States Patent
Garcia Gomez (10) Patent No.: US 8,549,747 B2
(45) Date of Patent: Oct. 8, 2013

(54) METHOD AND APPARATUS FOR PRODUCING A CATALYTIC CONVERTER

(75) Inventor: Rafael Garcia Gomez, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 427 days.

(21) Appl. No.: 12/823,311

(22) Filed: Jun. 25, 2010

(65) Prior Publication Data

US 2011/0171079 A1    Jul. 14, 2011

(30) Foreign Application Priority Data

Jun. 25, 2009  (DE) .......................... 10 2009 030 632

(51) Int. Cl.
*B01D 50/00* (2006.01)
(52) U.S. Cl.
USPC ............. 29/890; 29/455.1; 422/177; 422/222
(58) Field of Classification Search
USPC .................... 29/455.1, 890, 890.043, 890.08; 422/168, 177, 178, 179, 180, 221, 222, 422/592, 593; 502/527.12, 527.13, 527.15, 502/527.24; 60/299
See application file for complete search history.

(56) References Cited

U.S. PATENT DOCUMENTS

| | | | |
|---|---|---|---|
| 418,198 A * | 12/1889 | Lemp | 219/152 |
| 6,804,979 B2 | 10/2004 | Garcia Gomez | |
| 7,253,372 B2 * | 8/2007 | Ananthanarayanan et al. | 219/59.1 |
| 7,476,824 B2 * | 1/2009 | Ananthanarayanan et al. | 219/59.1 |
| 7,647,819 B2 | 1/2010 | Garcia Gomez | |
| 2003/0010079 A1 | 1/2003 | Garcia Gomez | |
| 2007/0157707 A1 | 7/2007 | Garcia Gomez | |

FOREIGN PATENT DOCUMENTS

| | | |
|---|---|---|
| DE | 32 11 986 A1 | 10/1982 |
| DE | 44 46 986 A1 | 7/1995 |
| DE | 202005004792 | 6/2005 |
| EP | 1 445 443 A1 | 8/2004 |
| JP | S 63-193720 U | 12/1988 |
| JP | 2003-206734 A | 7/2003 |
| WO | WO99/13204 A2 | 3/1999 |
| WO | WO02/24297 A2 | 3/2002 |

* cited by examiner

*Primary Examiner* — Alexander P Taousakis
(74) *Attorney, Agent, or Firm* — Henry M. Feiereisen, LLC (57) ABSTRACT

A method for producing a tubular catalytic converter, which includes a monolith wrapped in a mat and is disposed in a housing, includes forming a stepped longitudinal fold on a longitudinal side of a housing blank, wherein the longitudinal side on both sides of the fold to be formed is clamped by electrodes of opposite polarity across the fold. Electrode pairs on one side of the fold to be formed are then offset with respect to electrodes on the other side of the fold and the electrodes of opposite polarity move closer together, while a current is flowing between the electrodes of opposite polarity, heating the material in the fold. Opposing longitudinal sides of the tubular housing are then materially joined along the stepped longitudinal fold with the overlap to produce the housing for the tubular catalytic converter.

1 Claim, 7 Drawing Sheets

METHOD AND APPARATUS FOR PRODUCING A CATALYTIC CONVERTER

CROSS-REFERENCES TO RELATED APPLICATIONS

This application claims the priority of German Patent Application, Serial No. 10 2009 030 632.3, filed Jun. 25, 2009, pursuant to 35 U.S.C. 119(a)-(d), the content of which is incorporated herein by reference in its entirety as if fully set forth herein.

BACKGROUND OF THE INVENTION

The present invention relates to a method for producing a catalytic converter having a monolith wrapped in a mat and a housing, and an apparatus for producing a catalytic converter The following discussion of related art is provided to assist the reader in understanding the advantages of the invention, and is not to be construed as an admission that this related art is prior art to this invention.

Catalytic converters are used for post-treatment of exhaust gases in vehicles having a combustion engine. The catalytic converters typically include a housing, in which a monolith, for example a ceramic substrate, is arranged. The monolith is wrapped in a mat, which fills a gap between the monolith and the housing, thereby securing the position of the monolith. The housing may be made, for example, from a tube as a single piece made or may be made of several housing parts, which are connected to each other with screws or by welding. The mat is used to secure the position of the monolith inside the housing and to ensure the alignment in this position over various temperatures when operating under different loads. The monolith also protects the mat from damage because the monolith is by far one of the most expensive components of the catalytic converter. The monolith has typically a cylindrical geometry, wherein the diameter of the monolith can vary for production-related reasons. It is easier to adapt the housing to the overall dimensions of the monolith in production by taking into account the average diameter of the monolith.

Several methods are used in the art for enclosing a monolith for a catalytic converter in a housing. One of these methods is described in EP 1 445 443 A1. In this method, a sheet metal piece is cut to a predetermined size commensurate with the dimensions of the monolith and formed into a housing. The edges are connected by soldering. The outside dimensions of the monolith are determined by a contact-less measurement performed in a measuring station, wherein the monolith is scanned with a laser at defined measurement positions and an average diameter of the monolith is determined from the measured diameters. Disadvantageously, optical measurement systems with the required higher accuracy a relatively expensive and susceptive to failure; moreover, the exact positioning of monolith and laser as well as setting the measurement points increases the complexity.

It would therefore be desirable and advantageous to obviate prior art shortcomings and to provide a simplified method for producing a catalytic converter as well as an apparatus for producing the catalytic converter.

SUMMARY OF THE INVENTION

According to one aspect of the present invention, a method for producing a catalytic converter, which includes a monolith wrapped in a mat and is disposed in a housing, includes the steps of determining an average diameter of the monolith by introducing the monolith in a measurement space having an interior volume, filling a gap between the measurement space and the monolith with a fluid, measuring a quantity of fluid which corresponds to a volume difference between the monolith and the interior volume of the measurement space, and calculating the average diameter of the monolith from the volume difference. The method further includes the steps of determining a thickness of the mat, wrapping the monolith in the mat; forming a housing blank into a housing; and enclosing the wrapped monolith in the housing.

According to another aspect of the invention, an apparatus for determining an average diameter of a monolith includes a base plate configured to support the monolith, a measuring cylinder configured to receive the monolith supported on the base plate, a limiter configured to limit a measurement space to a length of the monolith, a flexible measuring tubing disposed in an intermediate space bounded by the base plate, an interior wall of the measuring cylinder, the limiter, and the monolith, means for filling the flexible measuring tubing, means for determining a filled-in fluid quantity, and means for calculating a volume difference between the monolith and an interior space of the measuring cylinder.

According to yet another aspect of the invention, a method for producing a stepped fold on a longitudinal side of a housing blank for a catalytic converter, which includes a monolith wrapped in a mat, includes the steps of arranging an inner electrode pair with a first positive electrode and a first negative electrode on an inner side of the housing blank with a first distance between the first positive electrode and the first negative electrode, arranging an outer electrode pair with a second positive electrode and a second negative electrode on an outer side of the longitudinal side with a second distance between the second positive electrode and the second negative electrode which is identical to the first distance, wherein the outer electrode pair has an offset relative to the inner electrode pair corresponding to at least a thickness of the housing blank. The method further includes the steps of applying a voltage to both the inner and the outer electrode pairs; and moving the first positive electrode relative to the first negative electrode and the second positive electrode relative to the second negative electrode, so that the first distance between the positive and negative electrodes of the corresponding first and second electrode pair is steadily reduced, while simultaneously moving the first and second positive electrodes and the first and second negative electrodes perpendicular to the housing blank.

According to still another aspect of the invention, an apparatus for producing a stepped fold on a longitudinal side of a housing blank includes an inner electrode pair with a first positive electrode and a first negative electrode having a first distance between the first positive electrode and the first negative electrode; and an outer electrode pair with a second positive electrode and a second negative electrode arranged in parallel with the first electrode pair and having a second distance between the second positive electrode and the second negative electrode which is identical to the first distance, wherein electrodes with identical polarity of the first and second electrode pairs are arranged next to each other, and wherein all electrodes are arranged for relative movement to one another.

According to yet another aspect of the invention, a catalytic converter includes a monolith wrapped in a mat and disposed inside a housing constructed of a formed housing blank having longitudinal edges which are joined with one another in a joining region, wherein a first of the longitudinal edges has in the joining region a stepped fold, with a second of the longitudinal edges abutting a radially outwardly oriented section of an inner side of the first longitudinal edge of the fold.

For producing a catalytic converter, a monolith is wrapped in a mat and arranged in a housing. The mat is provided for protecting and positioning the monolith. Because of the dimensions of the monoliths exhibit production-related variations, but the monoliths represent by far the most expensive component of the catalytic converter, the housing is adapted to the dimensions of the monolith.

For this purpose, the average diameter of the monoliths is determined in a first step. Also determined is the thickness of the mat in a compressed state, and the mat is wrapped around the monolith. The required inside diameter of the housing can then be determined from the average diameter and the thickness of the mat. The housing is formed from a housing blank which is cut to a size adapted to the average diameter and the thickness of the mat. In a last step, the monolith wrapped in the mat is enclosed by the housing blank which is, for example, formed into a tubular housing and welded.

The average diameter of the monolith is determined by introducing the monolith into the measuring space, positioning the monolith on a base plate and securing the monolith in position on the side facing the base plate with a pressure piston. The pressure piston may include means for determining the position of the monolith. The measurement space may be implemented, for example, as a hollow measuring cylinder having a known interior volume.

For measuring the volume of the monolith, the intermediate space between the measurement space and the monolith is filled with a fluid. The introduced quantity of fluid corresponds to a volume difference between the monolith and the interior volume of the measurement space and is used for calculating the average diameter of the monolith.

Preferably, a flexible measurement tubing filled with the fluid is arranged between an outer face of the monolith and an inside wall of the measurement space. This prevents contact between the monolith and the fluid and obviates the needs for an additional cover. The flexible measurement tubing is designed to make two-dimensional contact with both the outer circumferential side of the monolith and an interior wall of the measuring cylinder. By using a flexible material for the flexible measurement tubing, the flexible measurement tubing can contact the contour of the outer circumferential side of the monolith and the interior wall of the measuring cylinder during filling.

Limiters may be provided surrounding the pressure piston which delimit the annular intermediate space between the monolith and the interior wall of the measuring cylinder at an end face, i.e., in the longitudinal direction of the monolith facing the base plate. Alternatively, the pressure piston itself may simultaneously be used as a limiter. In this case, the cross-sectional surface area of the pressure piston corresponds to the cross-sectional area of the measuring cylinder, minus any necessary tolerances.

In addition, means are provided for filling the flexible measurement tubing with the fluid and for determining the filled fluid quantity. In addition, means are provided for calculating the volume difference between the monolith and the interior space of the measurement space, by which of the average diameter of the monolith can be determined. Most accurate results are produced by including the wall thickness of the flexible measurement tubing in the calculations.

The thickness of the mat in the compressed, i.e., installed state between the housing and the monolith must be added to the average diameter determined in this way. The thickness is determined by compressing the mat between two flat plates in contact with their lateral faces, until a predetermined force is attained. As soon as this force is reached, the distance between the plates is measured, with the distance corresponding to the thickness of the mat. The required interior diameter for the housing is obtained from the thickness of the mat at the determined average diameter of the monolith.

The housing is produced by forming a housing blank. The housing blank is cut to a size corresponding to the values determined for the average diameter of the monolith and the thickness of the mat, and formed into a tubular housing. The longitudinal edges of the housing blank can be joined in abutting relationship. Because the longitudinal edges are joined directly above or adjacent to the mat, a molybdenum foil is advantageously arranged in the joining region between the mat and the housing to prevent melt from a welding process or solder from a soldering process from making contact with the mat.

Advantageously, the longitudinal edges of the housing blank are joined with a mutual overlap, wherein one longitudinal side is folded with a step before joining. The stepped fold is produced by using an apparatus having two electrode pairs. With this apparatus, a positive electrode and a negative electrode from an inner electrode pair are arranged on an inner side of the housing blank along an end of the longitudinal side so that a first, for example the positive, electrode is arranged facing the longitudinal edge, and a second, for example the negative, electrode is arranged on the side of the first electrode facing away from the longitudinal edge. The electrodes of the outer electrode pair are arranged mirror-symmetrically relative to the inner electrode pair on an outer side face of the housing blank, so that electrodes with the same charge are always adjacent to one another and separated by the housing blank. In an initial position, the electrodes of both electrode pairs have the same distance from one another. The outer electrode pair is arranged on the outside of the housing blank with a relative offset from the inner electrode pair corresponding to a distance which is at least equal to the thickness of the housing blank. This produces an offset in the gap between the opposing end faces of the electrodes.

Before the longitudinal side is bent, the material of the housing blank is heated in the region of the gap by applying a voltage to both electrode pairs. The material is thereby softened in the region of the gap to the yielding point and can be more easily deformed.

For producing a step-shaped fold, the positive electrodes and the negative electrodes are moved against each other in such a way that the gap between the electrodes of the inner electrode pair and the electrodes of the outer electrode pairs is uniformly reduced. At the same time, a movement perpendicular to the housing blank produces the step-shaped fold. In an end position, a radially outwardly oriented region of the outer longitudinal side of the fold abuts an end face of the second electrode of the outer electrode pair, and a radially outwardly oriented region of the inner longitudinal side of the fold abuts an end face of the first electrode of the inner electrode pair. After forming, the step of the fold has a height which corresponds approximately to the thickness of the housing blank.

The position of the fold on the housing blank depends on the determined dimensions of the mat and the monolith. Decisive is the average diameter. Accordingly, the housing blank is folded only after the average diameter has been determined. The dimensions of the folded housing blank can thereby be optimally matched to the dimensions of the monolith. As a result, when the monolith wrapped in the mat is enclosed, one longitudinal edge of the housing blank directly abuts the inner side face of the radially outwardly oriented region of the longitudinal side. The monolith with the mat is then peripherally enclosed without a gap.

Advantageously, the mat is already compressed before the wrapped monolith is enclosed. This prevents creasing of the mat when the longitudinal sides are joined into joining region. To this end, for example, a thread is tightly wound around the mat. This can be accomplished with an apparatus in which the monolith with the mat is clamped, wherein either the monolith is rotated and the thread wound around the mat, or the thread is moved around the monolith for winding the thread around the mat.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
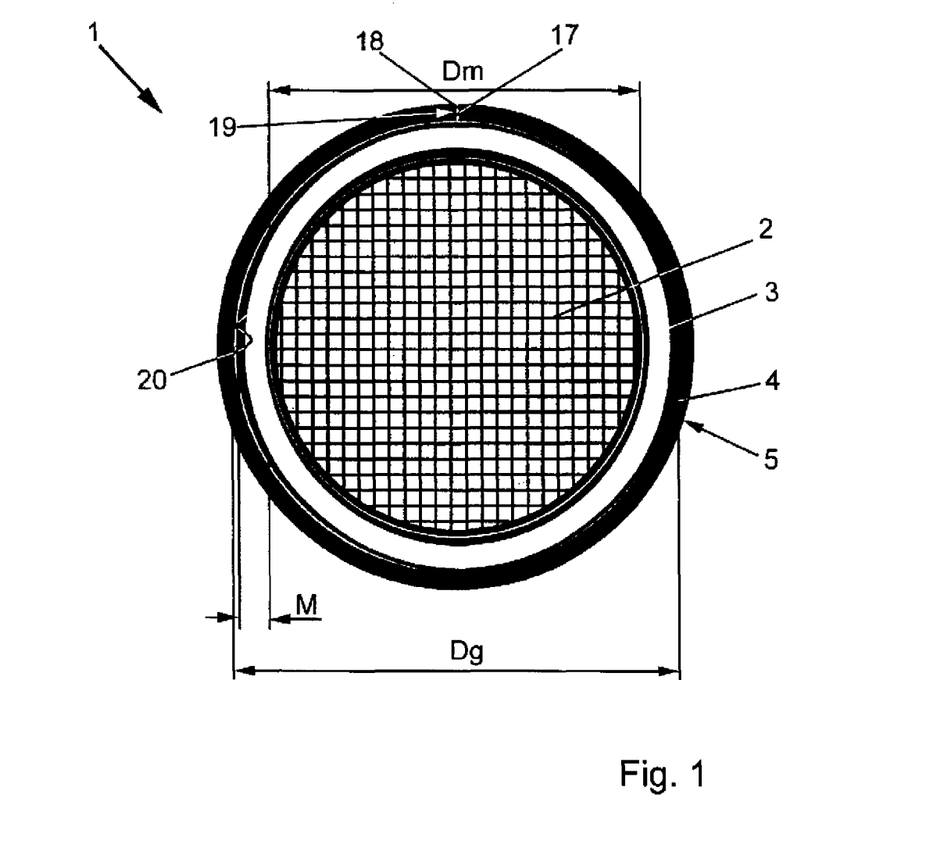
FIG. 1 shows in cross-section a catalytic converter enclosed in a housing.

Turning now to the drawing, and in particular to FIG. 1, there is shown in cross-section the basic configuration of a catalytic converter 1. A monolith 2 is arranged in the center of the catalytic converter 1. The monolith 2 is wrapped in a mat 3, by which the monolith 2 is fixed in position and protected. The monolith 2 and the mat 3 are enclosed in a cylindrical or tubular housing 5 formed from a housing blank 4. The inside diameter Dg of the housing 5 is matched to an average diameter Dm of the monolith 2 and a thickness M of the mat 3.

Figure 2:
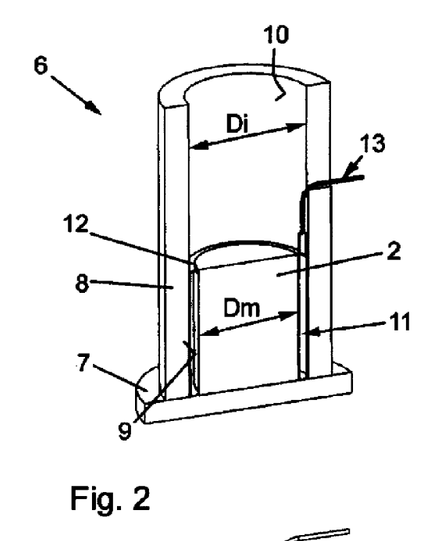
FIGS. 2 to 2c show an apparatus for determining the average diameter of a monolith.
Figure 2A:
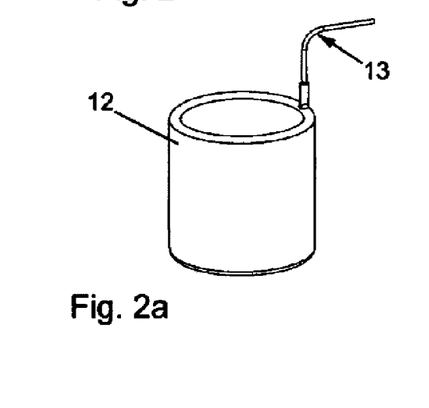
Figure 2B:
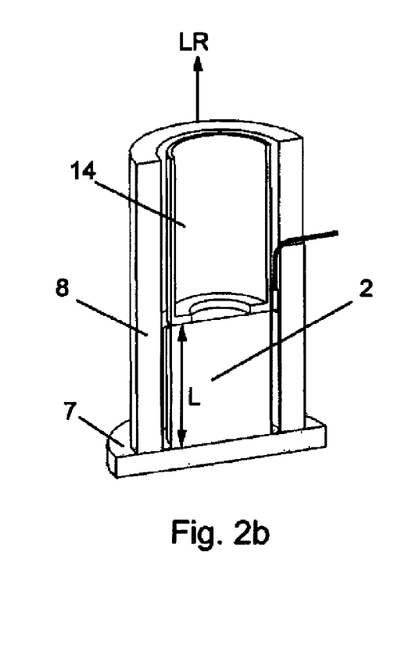
Figure 2C:
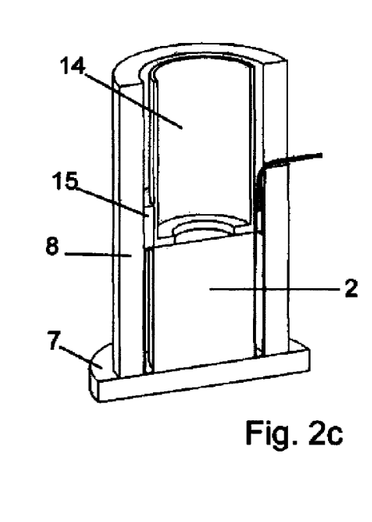

FIG. 2 illustrates the structure of an apparatus 6 for determining the average diameter Dm of the monolith 2 before the monolith 2 is wrapped in a mat and before being enclosed in a housing. The apparatus 6 includes a base plate 7 and a measuring cylinder 8. The monolith 2 is positioned on the base plate 7 inside the measurement space of the measuring cylinder 8. The inside diameter Di of the measuring cylinder 8 is dimensioned so that there is always a gap 11 between the outer peripheral side 9 of the monolith 2 and an interior wall 10 of the measuring cylinder 8. A flexible measurement tubing 12 is arranged in this gap 11. The flexible measurement tubing 12 is made of a flexible material and is configured for abutment with the entire outer peripheral side 9 of the monolith (FIG. 2a). The flexible measurement tubing 12 is filled by means 13 arranged on the wall of the measuring cylinder 8. A pressure piston 14 is arranged in the longitudinal direction LR of the measuring cylinder 8 on a side of the monolith 2 facing the base plate 7. The pressure piston 14 fixes the position of the monolith 2 on the base plate 7, and a length L of the monolith 2 can be determined from the position of the pressure piston 14.

Before the flexible measurement tubing 12 is filled, the gap 11 between the monolith 2 and the measuring cylinder 8 is delimited by limiters 15 which are arranged around the pressure piston 14 on the side of the monolith 2 facing the base plate 7. This ensures that the flexible measurement tubing 12 can expand only within the gap 11 bounded by limiters 14, the base plate 7, the interior wall 10 of the measuring cylinder 8, and the outside 9 of the monolith 2, with only this gap 11 being filled with fluid.

When a certain pressure is established at the fluid inlet, the filled fluid quantity is measured and the volume of the monolith 2 is calculated from the volume difference between the known interior volume of the measuring cylinder 8 and the quantity of fluid filled in. Based on this calculated volume, the average diameter Dm of the monolith 2 is calculated from the length L determined with the pressure piston 14.

Figure 3:
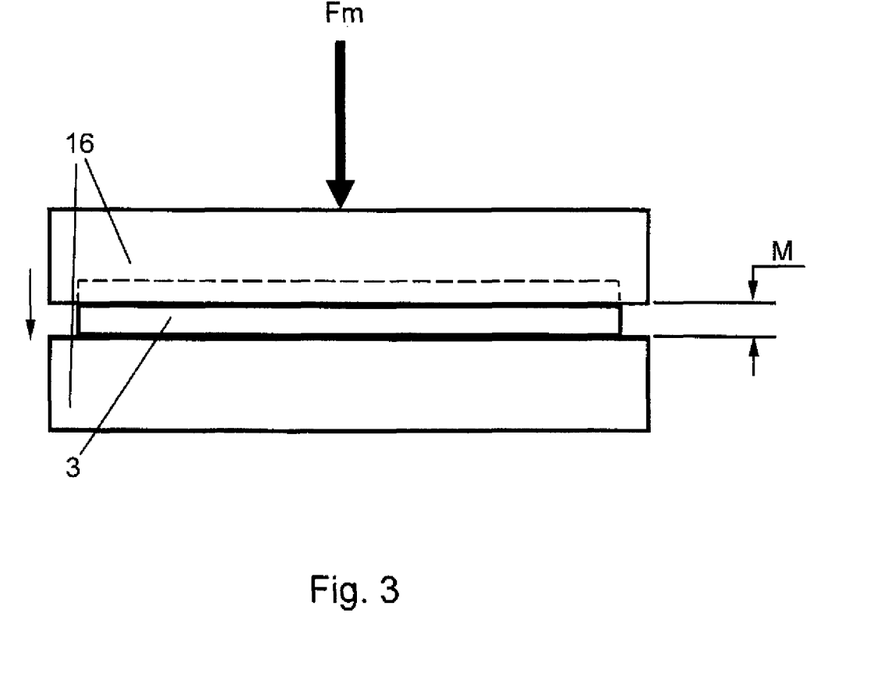
FIG. 3 shows plates for determining a thickness of a mat.

The thickness M of the mat 3 is determined by applying a force, as shown schematically in FIG. 3. In this embodiment, the side faces of the mat 3 are compressed by flat plates 16 until a defined force Fm is reached. A thickness M of the mat is then measured in this compressed state. The surface pressure for determining the defined force is a value defined by the manufacturer of the mat.

A required inside diameter Dg of the housing 5 is determined from the determined average diameter Dm of the monolith 2 and the determined thickness M of the mat 3 according to the equation $$Dg = 2M + Dm.$$

Starting from this required diameter Dg, the dimensions of the housing blank 4 are then calculated and the housing blank 4 is cut to size.

The catalytic converter 1 is manufactured by wrapping the monolith 2 in the mat 3 and then enclosing the monolith 2 in the housing 5. The mat 3 is compressed when the monolith 2 is enclosed in the housing 5. Creases may develop in the mat 3 in the region of a gap 19 between the longitudinal edges 17, 19 when the longitudinal edges 17, 18 (FIG. 1) of the housing blank 4 are joined. In order to achieve uniform contact between, on one hand, the mat 3 and the monolith 2 and, on the other hand, between the mat 3 and an inner side 20 of the housing 5, the mat 3 is advantageously uniformly compressed by winding a thread 21 around, before the monolith 2 and the mat 3 are enclosed by the housing blank 4.

Figure 4:
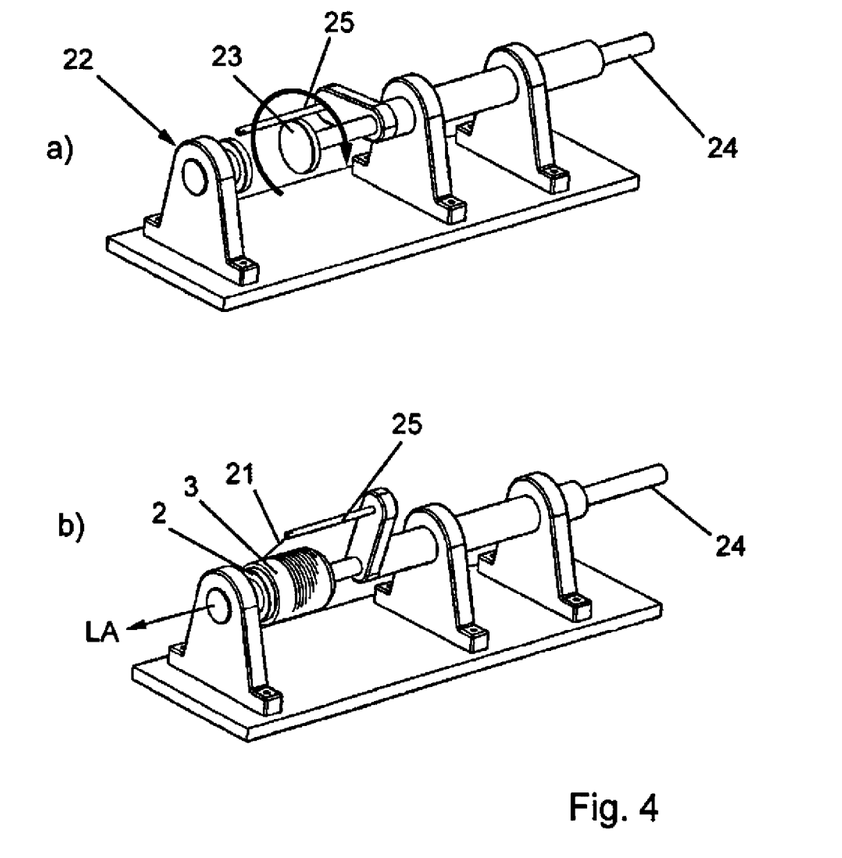
FIGS. 4a and 4b show an apparatus for wrapping the mat.

This can be done, for example, by using the winding apparatus 22 illustrated in FIGS. 4a and 4b. The end faces of a monolith 2 wrapped in a mat 3 are clamped in a holder 23. The holder 23 may be supported for rotation on one end of a shaft 24 and is, for example, rotated relative to a thread guide 25 about a longitudinal axis LA of the monolith 2. The thread 21 is wound around the mat 3, compressing the mat 3. Alternatively, the clamped monolith 2 may be stationary, while a thread guiding apparatus with the thread 21 is moved around the monolith 2 and the mat 3, thereby placing the thread 21 around the mat 3 and compressing the mat 3. Alternatively, the holder 23 and the thread guide 25 may rotate concurrently in opposite directions. For realizing the rotation of the thread guide 25 or the holder 23, a manual or automatic drive can be provided on the shaft 24.

Figure 5A:
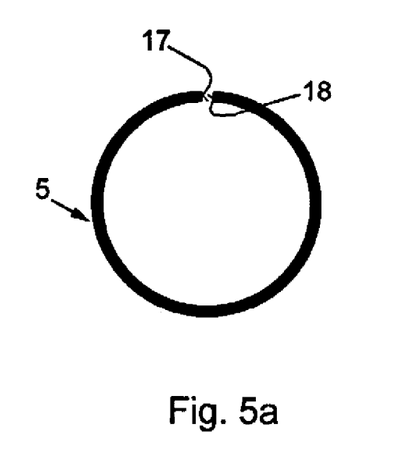
FIGS. 5a and 5b show housing variants.
Figure 5B:
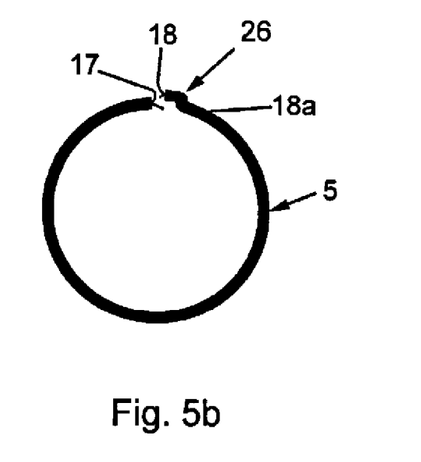
Figure 6:
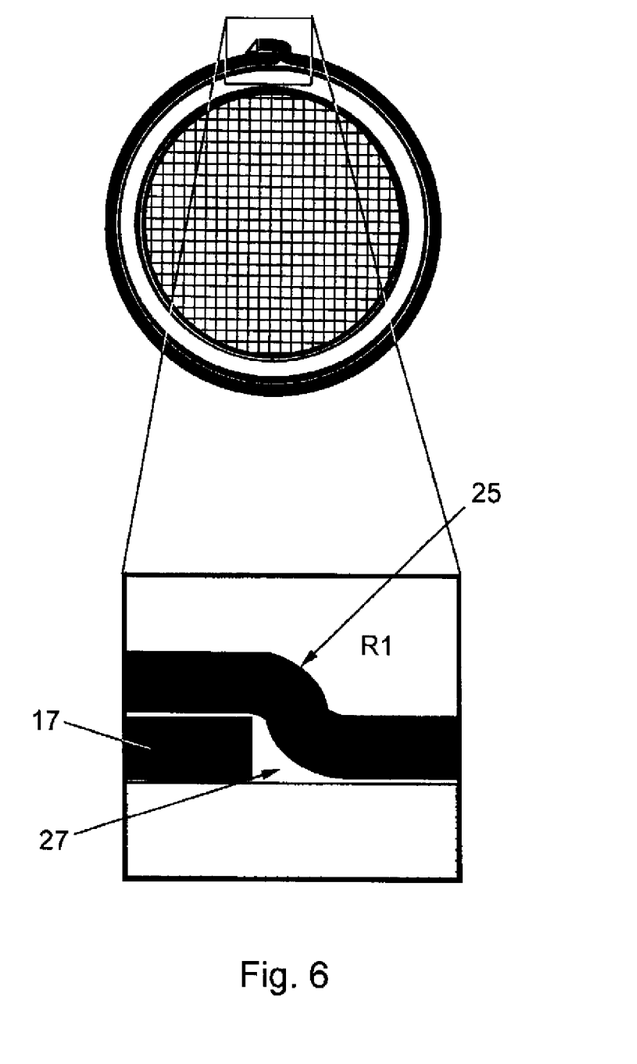
FIG. 6 shows a fold of a housing blank (state-of-the-art)

When producing a housing 5 from a housing blank 4, the longitudinal edges 17, 18 of the housing blank 4 may be butt-joined (FIG. 5a). Advantageously, however, they are joined with a mutual overlap (FIG. 5b). The wall of the housing 5 is then advantageously arranged between the weld seam and the mat, thus protecting the mat during welding. To this end, a stepped fold 26 is provided in the region of the longitudinal edge 18. With conventional methods, the fold 26 is produced by cold-forming. Disadvantageously, this approach produces relatively large negative radii of curvature R1, as illustrated in FIG. 6. This may produce a leak between the longitudinal edge 17 and the fold 26, through which exhaust gases may escape.

Figure 7A:
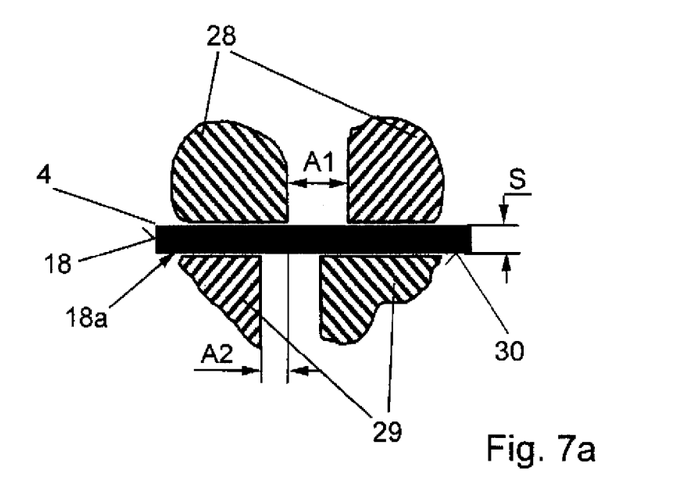
FIGS. 7a to 7e illustrate method steps for folding a housing blank.
Figure 7B:
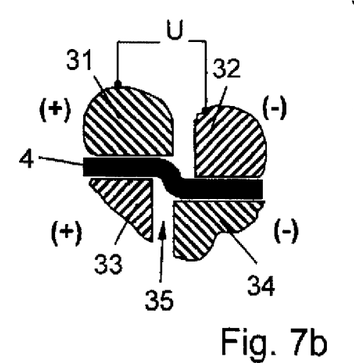
Figure 7C:
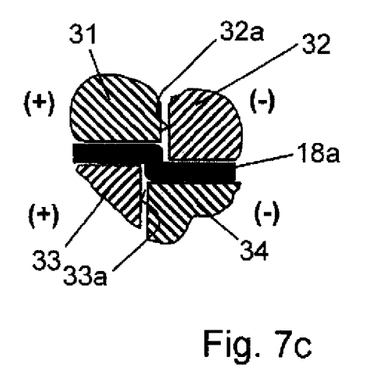
Figure 7D:
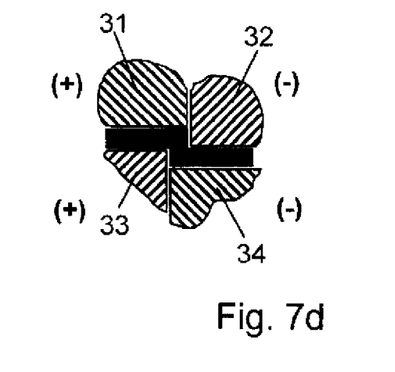
Figure 7E:
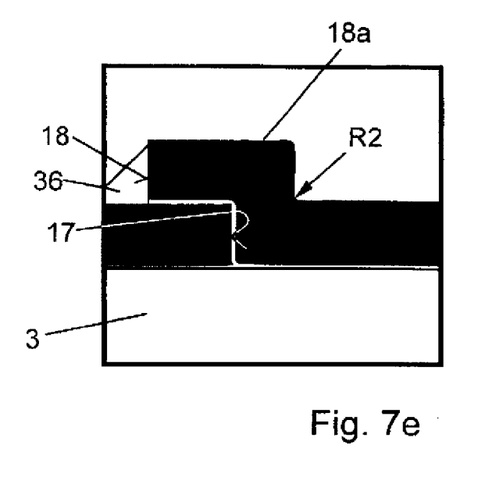

With the process illustrated in FIGS. 7a to 7d, a stepped fold 26 can be produced which reduces or even completely eliminates leaking of exhaust gases, FIG. 7e.

To this end, two electrode pairs 28, 29 are provided. An inner electrode pair 28 is hereby arranged on the inner side 20 of a longitudinal side 18a of the housing blank 1, with the longitudinal side 18a extending along the longitudinal edge 18. An outer electrode pair 29 is arranged on the outer side 30 of the longitudinal side 18a of the housing blank 4. The distance A1 between the positive electrode 31 and the negative electrode 3234 is identical to the distance between the positive electrode 33 and the negative electrode 34, thereby forming a gap 35 of constant width between the electrodes 31, 32; 33, 34.

The electrode pairs 28, 29 are mutually offset in the direction of the longitudinal edge 18 by a distance A2, which corresponds at least to a thickness S of the housing blank 4.

Before the forming process starts, a voltage U is applied between the positive electrode 31 and the negative electrode 32, and an identical voltage U is applied between the positive electrode 33 and the negative electrode 34 of the respective electrode pairs 28, 29, producing current flow through the housing blank 4 in the region of the gap 35 between the electrodes 31, 32; 33, 34. The material of the housing blank 4 heats up and softens in this region. By moving the positive electrodes 31, 33 relative to the negative electrodes 32, 34 in the X-direction, the identical gap 35 between the individual electrodes 31 and 33 and between the individual electrodes 32 and 34, respectively, of the electrode pairs 28, 29 decreases. At the same time, the positive electrodes 31, 33 are moved relative to the housing blank 45 in the vertical direction Y to produce a vertical offset between the electrodes 31 and 32 and between the electrodes 33 and 34, respectively, which also corresponds at least to a thickness S of the housing blank 4 (FIG. 7b). The gap 35 between the electrodes 31 and 32 and commensurately between the electrodes 33 and 34 is the further decreased while maintaining the vertical offset (FIGS. 7c and 7d), thereby deforming the material in the gap region 35 so as to form a defined step. The softened material of the housing blank 4 adapts to the geometry of the gap 35 between the opposing side faces so that a segment of the inner side 20 oriented perpendicular to the housing blank 4 abuts a side face 33a and a segment of the outer side 30 oriented perpendicular to the housing blank 4 abuts a side face 32a. This minimizes the radii R2 of the step of the fold 26.

When the housing blank 4 is formed into the housing 5 around the monolith 2 with the mat 3, the longitudinal edge 17 abuts a radially outwardly oriented section of the fold 26 when the housing blank 4 is joined, with the small radius R2 of the step leaving no free space through which exhaust gases could escape (FIG. 7e).

Figure 8A:
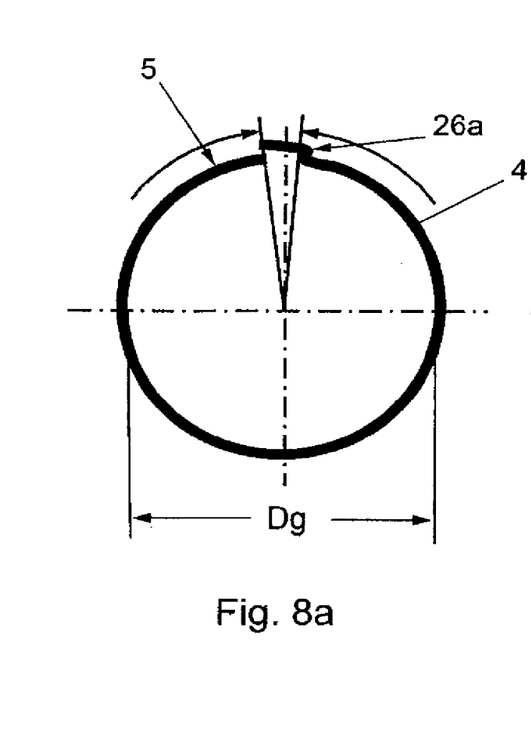
FIGS. 8a to 8c show housing blanks with folds.
Figure 8B:
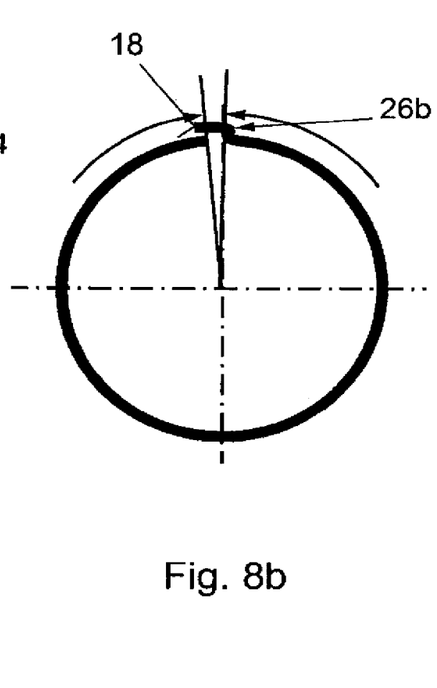
Figure 8C:
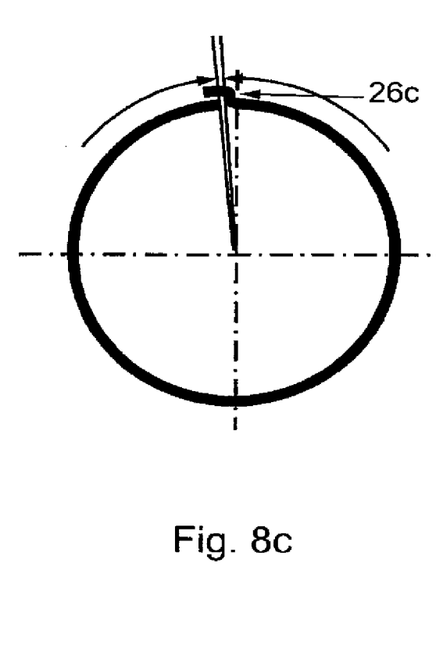

FIGS. 8a to 8c each show the housing 5 with a folded housing blank 4. The folds 26a, 26b, 26c are positioned depending on a previously determined average diameter of a monolith so that the inner diameter Dg of the closed housing 5 matches the average diameter of the respective monolith. It is evident that the folds 26a, 26b, 26c are arranged at different distances from the respective longitudinal edge 18. FIG. 8a shows a housing 5 for a monolith with a small average diameter. FIG. 8b shows a housing 5 for a monolith with a normal average diameter, while FIG. 8c shows a housing 5 for a monolith with a large average diameter.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for producing a tubular catalytic converter a housing for enclosing a monolith wrapped in a mat, the method comprising the steps of:
   cutting a housing blank to a dimension commensurate with an average diameter of the monolith and a thickness of the mat,
   bending the cut housing blank into a shape of the tubular housing with longitudinal sides providing an overlap,
   forming a stepped longitudinal fold on one of the longitudinal sides by:
   arranging on an inner side of the longitudinal side an inner electrode pair with a first positive electrode arranged on a first side of the stepped fold to be formed and a first negative electrode on a second side of the stepped fold to be formed with a first distance between the first positive electrode and the first negative electrode;
   arranging on an outer side of the longitudinal side an outer electrode pair with a second positive electrode arranged on the first side of the stepped fold to be formed and a second negative electrode on the second side of the stepped fold to be formed with a second distance between the second positive electrode and the second negative electrode, wherein the second distance is identical to the first distance, wherein the outer electrode pair has an offset relative to the inner electrode pair in a circumferential direction of the tubular housing corresponding to at least a thickness of the housing blank;
   applying a voltage to both the inner and the outer electrode pairs to produce a current flow between the first and second sides of the stepped fold to be formed, thereby heating to a yield point a region of the longitudinal side proximate to the stepped fold to be formed; and
   moving the first positive electrode relative to the first negative electrode and the second positive electrode relative to the second negative electrode, so that the first distance between the positive and negative electrodes of the corresponding first and second electrode pair is steadily reduced, while simultaneously moving the first and second positive electrodes and the first and second negative electrodes in a radial direction of the tubular housing, thereby forming the stepped longitudinal fold,
   and materially joining opposing longitudinal sides of the tubular housing along the stepped longitudinal fold with the overlap.

* * * * *

UNITED STATES PATENT AND TRADEMARK OFFICE
CERTIFICATE OF CORRECTION

| | | |
|---|---|---|
| PATENT NO. | : 8,549,747 B2 | Page 1 of 1 |
| APPLICATION NO. | : 12/823311 | |
| DATED | : October 8, 2013 | |
| INVENTOR(S) | : Rafael Garcia Gomez | |

It is certified that error appears in the above-identified patent and that said Letters Patent is hereby corrected as shown below:

In the Specification
Column 7, line 22:
Please replace "3234" with --32--.

In the Claims
Column 8, line 22, claim 1:
Please replace "converter a housing" with --converter housing--.

Signed and Sealed this
Eleventh Day of March, 2014

Michelle K. Lee
*Deputy Director of the United States Patent and Trademark Office*